March 29, 1949. J. B. TINDALL 2,465,959
RECOVERY OF NITROMETHANE FROM AQUEOUS
ALCOHOLIC MIXTURES THEREOF
Filed June 28, 1946
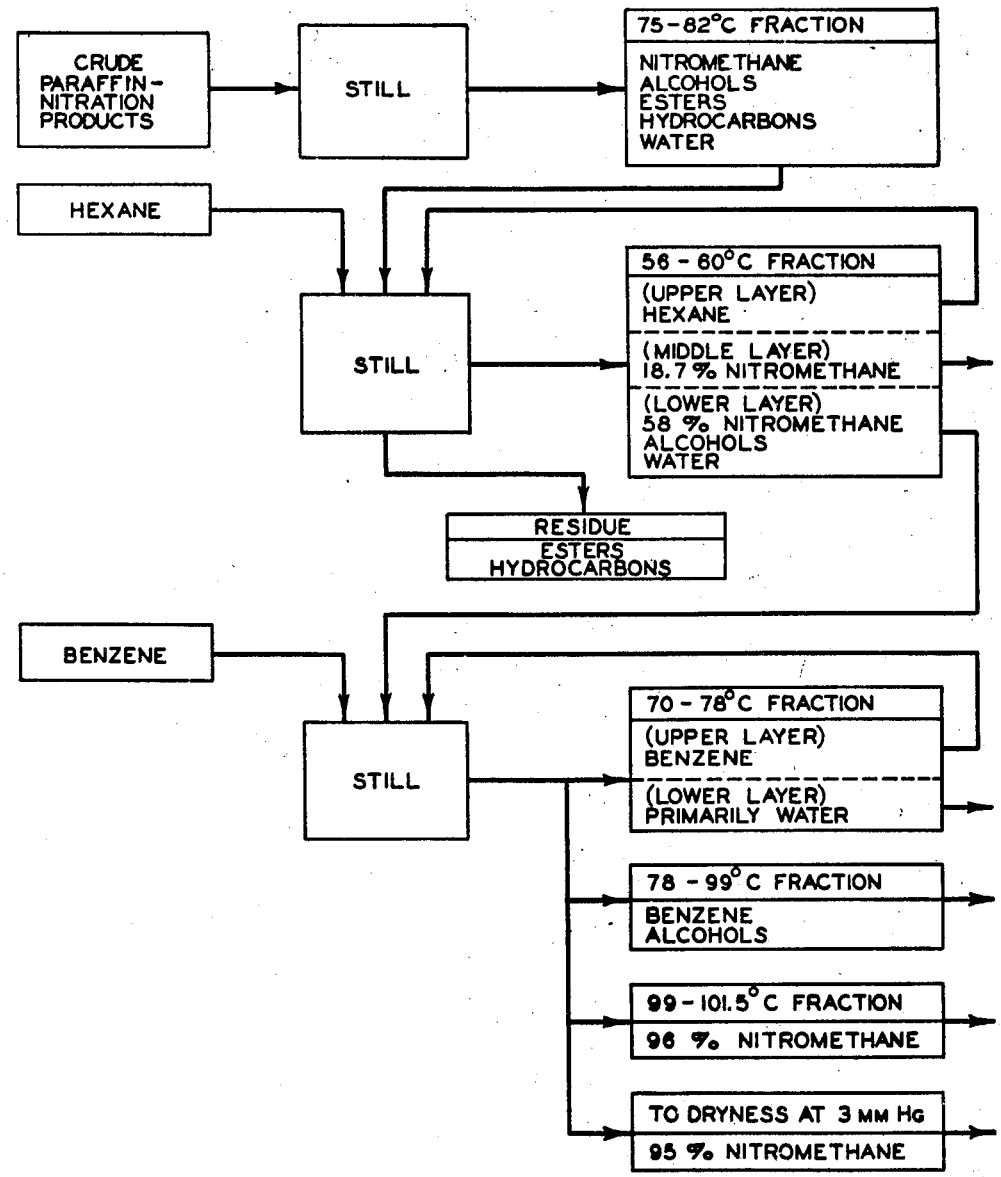
INVENTOR.
John B. Tindall
BY Francis M. Crawford.

Patented Mar. 29, 1949

2,465,959

UNITED STATES PATENT OFFICE 2,465,959

RECOVERY OF NITROMETHANE FROM AQUEOUS ALCOHOLIC MIXTURES THEREOF

John B. Tindall, Terre Haute, Ind., assignor to Commercial Solvents Corporation, Terre Haute, Ind., a corporation of Maryland Application June 28, 1946, Serial No. 679,895

5 Claims. (Cl. 202—42)

My invention relates to the separation of nitromethane from aqueous-alcoholic mixtures thereof and especially to the separation of nitromethane from such mixtures obtained by distilling the reaction products of the vapor-phase nitration of alkanes.

The drawing shows a flow sheet of my process.

Nitromethane forms complex azeotropes with aqueous-alcoholic mixtures which are extremely difficult to separate into the individual components, even with the most efficient types of distillation apparatus. In fact, it is a practical impossibility to separate nitromethane from such mixtures by fractional distillation. Such mixtures are encountered in the distillation of the reaction products from the vapor-phase nitration of alkanes.

In the vapor-phase nitration of alkanes, the principal reaction products are nitroalkanes, water, and aliphatic alcohols, with substantial proportions of aldehydes, ketones, organic acids, tar-forming substances, hydrocarbons, and esters, all of which tend to increase the complexity of the problem of separating nitromethane therefrom in substantially pure form, in view of the tendency of nitromethane to form complex azeotropes. In distilling these nitromethane-containing mixtures, approximately 25% of the nitromethane originally present therein is ordinarily obtained in the form of a so-called "heads fraction," which comprises a mixture of azeotropes and includes most of the impurities that interfere with the separation of nitromethane. The remainder of the nitromethane is left behind in a comparatively simple mixture of nitroparaffins and higher-boiling impurities, from which the individual components may conveniently be distilled.

The heads fraction, boiling from about 75 to about 82° C., comprises nitromethane, water, such aliphatic alcohols as ethanol, n-propyl alcohol, isopropyl alcohol, and secondary butyl alcohol, and in addition, miscellaneous esters, hydrocarbons, and other impurities named above. It is the heads fraction from which the separation of nitromethane in a substantially pure condition is difficult. The percentage of nitromethane present in such fractions will be found to vary rather widely, usually from 35 to 55%. In general, however, the concentration of nitromethane in the 75–82° fraction depends chiefly on the amount of that nitroparaffin present in the mixture of liquid reaction products initially obtained from the vapor-phase nitration process, and the reflux ratio employed in obtaining this 75–82° fraction.

Previously, attempts have been made to separate the nitromethane by solvent extraction and by "salting out," but these methods have likewise failed. More recently, a comparatively satisfactory procedure for separating nitromethane from such complex mixtures has been provided which involves the addition of an alkaline catalyst to said complex mixture and thereafter adding formaldehyde to form tris(hydroxymethyl)-nitromethane, which is normally a solid. The latter may then be readily separated from the mixture by distillation at reduced pressure. In order to obtain the free nitromethane, the tris(hydroxymethyl) nitromethane must be decomposed by subjecting the latter to the action of alkali. Such a procedure is not entirely satisfactory, however, since nitromethane is unstable in an alkaline medium. It will therefore be apparent that a considerable quantity of nitromethane is lost when an attempt is made to recover it from such mixtures in accordance with the aforesaid procedure.

I have now discovered that the nitromethane present in such mixtures can be readily and substantially completely recovered from such mixtures by means of a two-step azeotropic-distillation procedure, utilizing added azeotrope-formers in the successive steps. In accordance with my invention, hexane is added to the aforesaid fraction, having a boiling range between about 75 and 82° C., and the resulting mixture is then subjected to fractional distillation at atmospheric pressure to obtain a three-phase distillate boiling at 56–60° C. The top layer, consisting essentially of hexane, is continuously returned to the still. The bottom layer, containing the greater portion of the nitromethane, together with water and part of the aliphatic alcohols is withdrawn and collected. The middle layer does not accumulate or increase in volume during the distillation; such quantity as remains in the decanter at the end of the distillation is recycled in the succeeding distillation. The esters and hydrocarbons are left behind in the still residue at the completion of the distillation. The bottom layer is subsequently mixed with benzene, and the mixture is distilled to remove the water and aliphatic alcohols as constant-boiling mixtures with benzene, leaving substantially pure nitromethane in the distillation kettle. The accompanying flow sheet will serve further to clarify the process of my invention. The hexane and benzene may be readily recovered for reuse by washing them with water or any other suitable solvent for the alcohols dissolved therein.

Since nitromethane is produced, at least to some extent, in combination with lower aliphatic alcohols in the vapor-phase nitration of all hydrocarbons having from 2 to 8 carbon atoms, it will be apparent that the process of the present invention is applicable to the treatment of the liquid reaction products resulting from the vapor-phase nitration of all hydrocarbons coming within the aforesaid group. My process has been found to be particularly useful in the treatment of liquid reaction products resulting from the vapor-phase nitration of ethane, propane, and the butanes.

The quantity of hexane and benzene utilized in the respective distillation steps of my invention may vary rather widely. In fact, only a relatively small volume of either need be employed, since, in actual operation, the hexane and benzene layers are continuously returned to the fraction being distilled. The quantity of benzene should be adjusted, however, so that after the removal of water and a portion of the aliphatic alcohols as the bottom layer, there is sufficient benzene left to remove the remaining alcohols as a single-phase binary mixture. Ordinarily I prefer to use hexane and benzene in an amount which corresponds to approximately one-half of the volume of the fraction treated.

My invention may be further illustrated by the following specific example:

Example

The liquid reaction products formed by the vapor-phase nitration of propane were distilled and the fraction boiling between about 75 and 82° C. was collected separately. A mixture of 447.3 g. of this fraction, of which 52% was nitromethane and the remainder was isopropyl alcohol, n-propyl alcohol, water, n-propyl acetate, and hydrocarbons, and 200 g. of hexane was distilled through a column and into a separator. Distillation began at 56° C., the distillate at this stage being composed of three layers, having the following composition:

Upper layer: Hexane
Middle layer: 18.7% nitromethane
Bottom layer: 58% nitromethane The upper layer was returned to the distillation flask from the separator, the middle layer, which did not change substantially in volume during the distillation, was allowed to remain in the separator, and the lower layer was withdrawn until, around 60° C., substantially no lower layer was being distilled. The distillation was then stopped, the middle layer was withdrawn, and the weights and compositions of the various fractions were measured:

| | Grams |
|---|---|
| Bottom layer (58% nitromethane) | 316.5 |
| Middle layer (18.7% nitromethane) | 26.7 |
| Still residue (13.1% nitromethane) | 254.3 |

A mixture of 309.3 g. of the bottom layer and 265 g. of benzene was distilled through a column and separator, the benzene layer being returned continuously to the distillation flask while the lower layer was withdrawn, until the distillate began to appear in one phase. During this time, 61.4 g. of lower layer, comprising 2.7% nitromethane and a small quantity of lower aliphatic alcohols, were removed. Subsequently, the single-phase mixture in the still kettle was further distilled into the following fractions:

70-78° C.; 204.5 g.:
  Benzene
  7.7% nitromethane
  Lower aliphatic alcohols
78-99° C. (mostly at 79° C.); 142 g.:
  Benzene
  16.4% nitromethane
99-101.5° C.; 109.2 g.: 96% nitromethane
To dryness at 3 mm. Hg; 28.5 g.: 95% nitromethane As a result of the above distillations, a total of 60% of the nitromethane originally present in the 75-82° C. fraction was recovered in substantially pure form.

The above example is, of course, to be understood as being merely illustrative and does not in any way limit the scope of my invention. As indicated previously, my process is equally adaptable to the recovery of nitromethane from any mixtures which are composed essentially of the materials specified. My invention is not limited to any particular conditions for effecting the necessary distillations. For example, when operating on a relatively large scale, it may be desirable to effect the distillations at reduced pressures. In general, it may be said, that any modifications of procedure or the use of any equivalents which would occur to those skilled in the art is included within the scope of my invention.

This application is a continuation-in-part of my application S. N. 541,851, filed June 23, 1944, now abandoned.

In accordance with the foregoing specification, I claim as my invention:

1. In a process for treating a fraction obtained in distilling liquid reaction products from the vapor-phase nitration of hydrocarbons having from 2 to 8 carbon atoms, said fraction comprising mainly nitromethane, lower-aliphatic alcohols, esters of said alcohols, hydrocarbons, and water, the steps which comprise mixing said fraction with hexane, distilling the resultant mixture to produce an azeotrope consisting essentially of hexane, nitromethane, lower-aliphatic alcohols, and water, condensing said azeotrope to form three layers, returning the hexane to the still while separating the bottom layer consisting essentially of nitromethane, lower-aliphatic alcohols, and water, adding benzene to the bottom layer, distilling the resultant mixture and withdrawing the lower-aliphatic alcohols as components successively of a benzene-water azeotrope and a benzene azeotrope, and obtaining nitromethane in substantially pure form as a residue from said distillation.

2. The process of claim 1 wherein the fraction subjected to treatment is obtained from the vapor-phase nitration of propane.

3. The process of claim 1 wherein the fraction subjected to treatment is obtained from the vapor-phase nitration of butane.

4. In a process for the recovery of nitromethane from a fraction obtained by distilling liquid reaction products from the vapor-phase nitration of propane, said fraction boiling between about 75 and 82° C., and comprising mainly nitromethane, isopropyl alcohol, n-propyl alcohol, esters, hydrocarbons, and water, the steps which comprise adding hexane to said fraction, distilling the resultant mixture to obtain an azeotrope boiling between 56 and 60° C., said azeotrope separating into three layers, returning the hexane to the still while separating and withdrawing the lower layer, adding benzene to said lower layer, and fractionally distilling to obtain a fraction boiling between about 99 and 101.5° C., consisting of substantially pure nitromethane.

5. In a process for the recovery of nitromethane from a fraction obtained by distilling liquid reaction products from the vapor-phase nitration of propane, said fraction boiling between about 75 and 82° C., and comprising mainly nitromethane, isopropyl alcohol, n-propyl alcohol, esters, hydrocarbons, and water, the steps which comprise adding hexane to said fraction, distilling the resultant mixture to obtain an azeotrope boiling between 56 and 60° C., said fraction separating into three layers, returning the hexane to the still while separating and withdrawing the lower layer, adding benzene to said lower layer, distilling the resultant mixture and withdrawing the said propyl alcohol in the form of azeotropes with benzene and water, distilling to separate a fraction boiling between about 99 and 101.5° C. consisting of substantially pure nitromethane, and further distilling to dryness under reduced pressure to recover additional substantially pure nitromethane.

JOHN B. TINDALL.

REFERENCES CITED

The following references are of record in the file of this patent:

UNITED STATES PATENTS

| Number | Name | Date |
| --- | --- | --- |
| 1,676,735 | Keyes | July 10, 1929 |
| 2,316,126 | Geckler | Apr. 6, 1943 |
| 2,317,557 | Senkus | Apr. 27, 1943 |
| 2,351,527 | Lembecke | June 13, 1944 |